United States Patent [19]

Trubiano

[11] Patent Number: 4,678,195
[45] Date of Patent: Jul. 7, 1987

[54] SHOPPING CART APPAREL HANGER

[75] Inventor: Antoine Trubiano, Pointe aux Trembles, Canada

[73] Assignee: Cari All Inc., Quebec, Canada

[21] Appl. No.: 813,424

[22] Filed: Dec. 26, 1985

[51] Int. Cl.$^4$ ............................................. B62D 39/00
[52] U.S. Cl. ............................... 280/33.99 A; 223/89; 224/42.46 A; 248/333
[58] Field of Search ............... 280/33.99 R, 33.99 A, 280/33.99 H, 33.99 S, 655, 79.3; 223/85, 90, 89; 224/42.45 A, 42.46 A; 248/175, 303, 327, 333, 407, 125

[56]   References Cited
U.S. PATENT DOCUMENTS 2,526,285 10/1950 Schugler .................. 224/42.45 A
2,975,999  3/1961 Bunch ............................. 248/303
3,909,034  9/1975 Trubiano ................... 280/33.99 A
3,995,823 12/1976 Hensel ............................ 248/327
4,047,687  9/1977 Turner .............................. 248/333

Primary Examiner—John J. Love
Assistant Examiner—Richard Camby
Attorney, Agent, or Firm—Oblon, Fisher, Spivak, McClelland & Maier

[57]   ABSTRACT

A shopping cart having a frame supported on casters, and wherein the frame defines a basket having side walls, a front and rear wall, a bottom wall, and an open top end. A handle bar is secured to the frame rearwardly of the rear wall to displace the shopping cart on the casters. The improvement comprises an elongated support rod secured to the frame and extending substantially vertically from a side wall above the open top end. The top end of the support rod is adapted to support an article of clothing. Another improvement resides in that a drinking container support bracket is secured intermediate the handle bar and the top edge of the rear wall.

5 Claims, 4 Drawing Figures

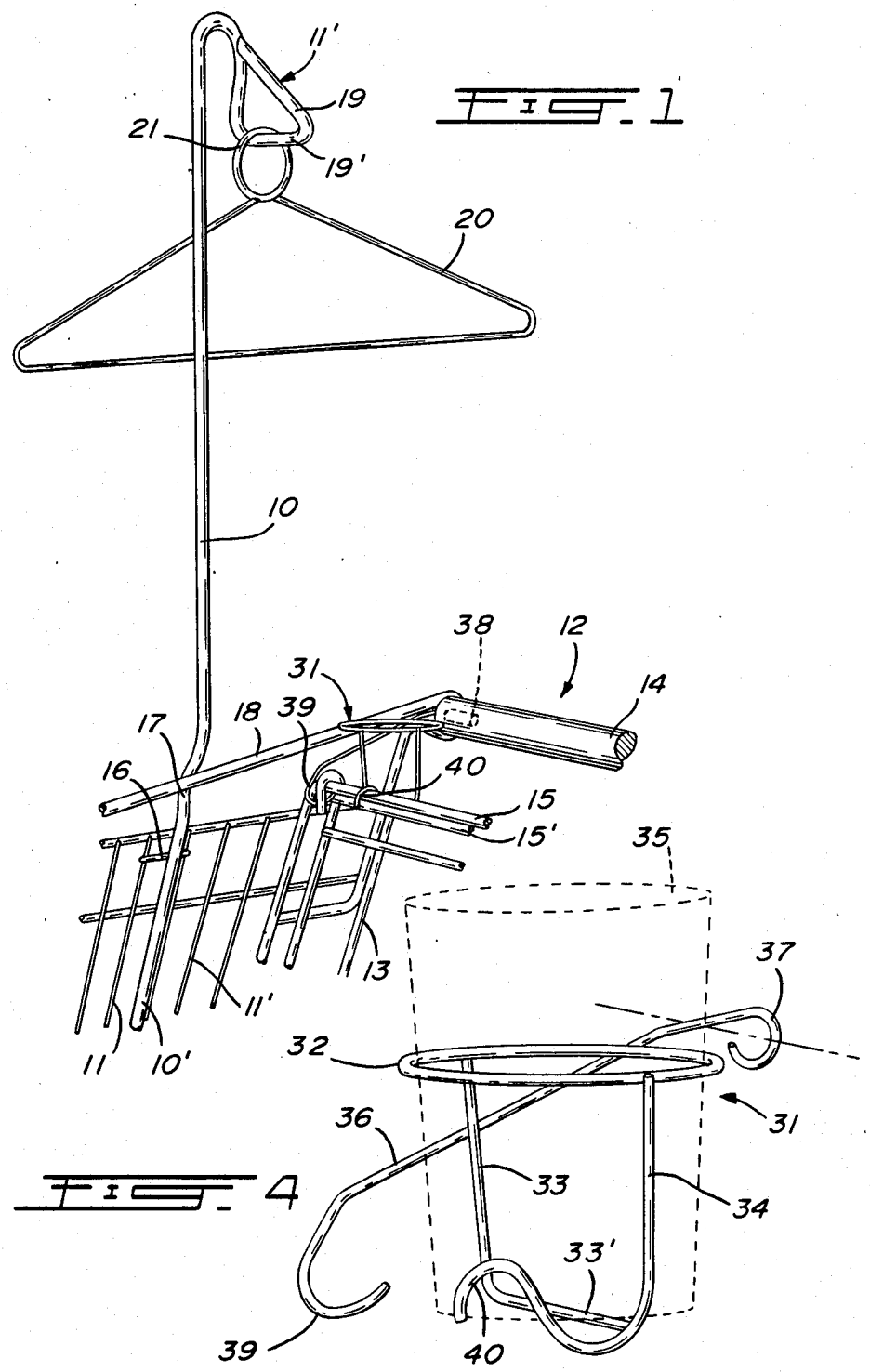

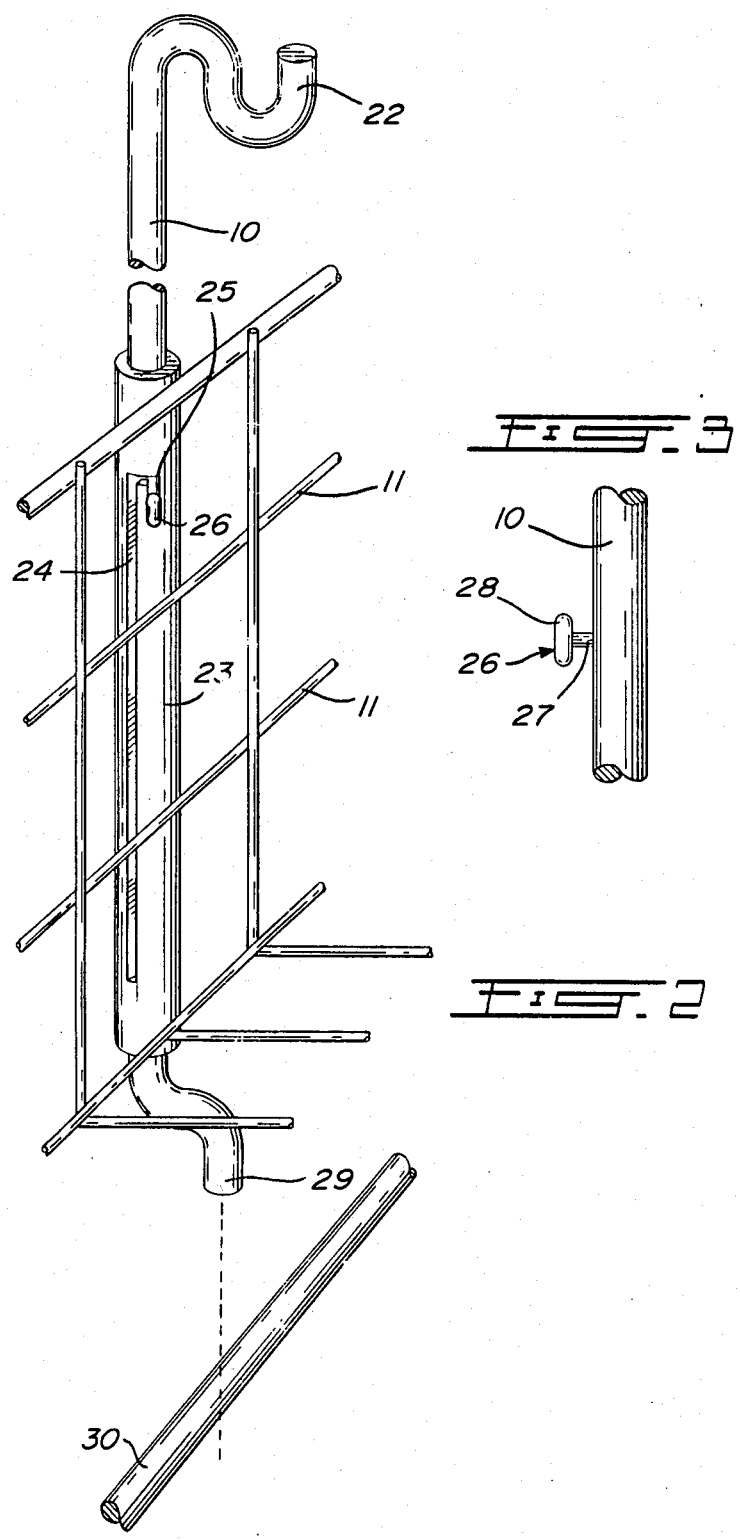

SHOPPING CART APPAREL HANGER

BACKGROUND OF THE INVENTION

1. Field of the Invention

The present invention relates to improvements in a shopping cart and particularly the provision of an elongated support rod secured to the shopping cart frame and extending substantially vertically from a side wall of the basket above the open top end and adapted to support an article of clothing to the side of the shopping cart. Further, a drinking container support bracket is secured intermediate the handle bar and the top edge of the rear wall.

2. Description of the Prior Art

There exists a need to provide a shopping cart which will suit many of the needs of the user of the cart while pushing the cart through the aisles of a shopping store. Often, the shopping person is wearing an article of clothing which needs to be removed when in a warm environment. Usually, that person will place the article of clothing in the basket of the shopping cart or on the rear seat attached to the rear gate of the cart. There are many disadvantages in placing articles of clothing in a shopping cart. For example, the clothing may be crumpled or soiled by the goods placed in the shopping basket. Also, there is less room in the shopping basket to place goods therein. Furthermore, the placement of a coat or similar apparel within the basket constitutes a vehicle for theft in that small goods may be easily placed in the pockets of the apparel, which articles are undetected.

A further disadvantage when using shopping carts is that often a person will carry a glass or a can containing a drink and often the liquid is spilled within the basket by accident. Another problem is that often these cups or cans are left in shelves or ash containers within the shopping store and are an eyesore and also require constant cleaning of the shelves.

SUMMARY OF INVENTION

It is a feature of the present invention to provide an improved shopping cart which substantially overcomes all of the above-mentioned problems.

Another feature of the present invention is to provide a shopping cart which is provided with an elongated support rod which is secured to the frame and extends substantially vertically from one of the side walls to support an article of clothing outside the shopping basket.

Another feature of the present invention is to provide an improved shopping cart having a drinking container support bracket secured intermediate the handle bar and the top edge of the rear wall of the shopping cart.

According to the above features, from a broad aspect, the present invention provides a shopping cart having a frame supported on casters with the frame defining a basket having side walls, a front and rear wall, a bottom wall, and an open top end. A handle bar is secured to the frame rearwardly of the rear wall to displace the shopping cart on the casters. The improvement comprises an elongated support rod secured to the frame and extending substantially vertically from one of the side walls above the open top end. Support means is formed in a top end of the support rod for supporting articles of clothing outside the basket and above a floor surface.

According to a further broad aspect of the present invention, there is provided a shopping cart having a frame supported on casters with the frame defining a basket having side walls, a front and a rear wall, a bottom wall, and an open top end. A handle bar is secured to the frame rearwardly of a top edge of a rear wall whereby to displace the shopping cart on the casters. The improvement comprises a drinking container support bracket secured intermediate the handle bar and the top edge of the rear wall.

BRIEF DESCRIPTION OF DRAWINGS

A preferred embodiment of the present invention will now be described with reference to the examples thereof as illustrated in the accompanying drawings in which:

FIG. 1 is a fragmented perspective view illustrating the clothing support rod which is secured to the shopping cart;

FIG. 2 shows another example of the clothing support rod and having a telescopic attachment with the shopping cart;

FIG. 3 is a perspective fragmented view of a portion of the support rod; and

FIG. 4 is an enlarged view of the drinking container support bracket which is secured intermediate the handle bar and top edge of the rear wall of the shopping cart as shown in FIG. 1.

DESCRIPTION OF PREFERRED EMBODIMENTS

Referring to the drawings and more particularly to FIGS. 1 to 3, there is shown at 10, a clothing support rod secured to a side wall 11 of a shopping cart, generally shown at 12. The shopping cart is of the type well known in the art and has a frame (not shown) supported on casters (not shown) with the frame supporting a basket having opposed pairs of side walls 11, a front wall, and bottom wall (not shown) and a rear wall 13. The basket has an open top end defined intermediate the front wall, rear wall and side walls. A handle bar 14 is secured to the frame rearwardly of the rear wall 13 and slightly above the top edge 15 of the rear wall 13 whereby the shopping cart can be displaced on its casters by pushing or pulling the handle bar 14.

The improvement in this shopping cart 12 is the provision of the clothing support rod 10 and as hereinshown, this rod is comprised by an elongated support rod which is secured to the side wall by suitable securement means such as the clamps 16 interconnecting a straight securement section 10' of the rod to the vertically extending wire rods 11' forming the side wall 11. As hereinshown, the rod 10 is further provided with a notched section 17 to provide passage for the structural rod 18 forming part of the shopping cart. The top end of the support rod 10 is provided with a clothing support means 11". This clothing support means may have various configurations and as shown in FIG. 1, it is constituted by forming the top end of a support rod in a loop, herein a triangular closed loop 19. This loop forms a support bar 19' on which a coat hanger 20 is immovably secured through an attachment ring 21.

As shown in FIG. 2, the clothing support means is constituted by forming the top end 11' of the support rod 10 in a hook configuration 22. Also, as shown in FIG. 2, the support rod 10 is a straight rod which is telescopically received in a pipe coupling 23 which is welded or otherwise secured to the side wall 11 of the shopping cart. The pipe coupling 23 extends substantially vertically and has an elongated straight guide slot 24 formed in a section thereof. A locking cavity 25 is formed integral with the guide slot 24 in a top end thereof. This locking cavity is constituted by forming the top end of the guide slot 24 in an inverted-U whereby a transverse guide finger or pin 26 (see FIG. 3), which is secured to the rod 10, may be engagedly supported. As shown in FIG. 3, the guide finger comprises a transverse pin section 27 having an enlarged head 28 spaced from the outer wall of the support rod 10. The length of the guide slot 24 is selected to arrest the telescopic displacement of the rod 10 in its uppermost and lowermost position.

As shown in FIG. 2, the support rod 10 may be further provided with an engaging bottom end 29 which is constituted by forming the support rod as an offset angulated engagement finger whereby to overlap a support rod 30 of a bottom section of the shopping cart frame when the rod is retracted within the pipe coupling 23.

Referring now to FIGS. 1 and 4, reference numeral 31 denotes a drinking container support bracket which is secured intermediate the handle bar 14 and the top edge 15 of the rear wall 13. The drinking container support bracket 31 comprises essentially a loop wire member 32 supported substantially in a horizontal plane by at least two spaced-apart vertical support rods 33 and 34. A bottom support member, herein a transverse rod section 33' of the vertical support rod 33, extends diametrically across and spaced downwardly from the loop wire rod 32 whereby a drinking container, as shown by phantom lines 35, may be supported on the bottom rod 33' and extend through the loop 32.

In order to support the drinking container support bracket in the position as shown in FIG. 1, there is provided a connecting means in the form of a connecting wire rod 36 provided with a loop end 37 for securement about a locking bolt 38 which is threadedly engaged in the end of the handle bar 14. The connecting wire rod 36 is further provided with a hook end 39 which is configured to be supported over the wire rod 15' at the top edge 15 of the rear wall 13. The connecting wire rod 36 is also welded or otherwise secured to the vertical support rod 33.

In order to add rigidity to the connection of the drinking container support bracket 31 with the shopping cart, the connecting means may further comprise forming the other vertical support rod 34 with an extended hook end 40 which is also supported over the top wire rod 15' of the rear wall 13. Both hook ends 39 and 40 may be bent over the rod 15' whereby to immovably secure the drinking container support bracket 31. However, by simply resting these loop ends on the top rod 15', it can be seen that the drinking container support bracket 31 may be hinged outwardly and hang under the handle bar 14 in a corner thereof.

It is within the ambit of the present invention to cover any obvious modifications of the examples of the invention as herein described, provided such modifications fall within the scope of the appended claims.

I claim:

1. In a shopping cart having a frame supported on casters, said frame defining a basket having side walls, a front and rear wall, a bottom wall and an open top end, a handle bar secured to said frame rearwardly of said rear wall to displace said shopping cart on said casters, the improvement comprising an elongated support rod telescopically secured to one of said side walls and extending substantially vertically from one of said side walls above said open top end, and support means formed in a top end of said support rod for supporting articles of clothing outside said basket and above a floor surface, said support rod having a straight securement section received in a pipe coupling secured to said one of said side walls of said basket, said pipe coupling extending substantially vertically and having an elongated straight guide slot therein, a locking cavity formed integral with said guide slot in a top end thereof, said straight securement section having a transverse guide finger projecting through said slot and configured to enter said locking cavity whereby to support said support rod in an extended position above said basket open top end, said support rod also having an engaging bottom end configured to overlap a rod of a bottom section of said frame to support said support rod in a retracted position.

2. A shopping cart as claimed in claim 1 wherein said engaging bottom end is constituted by forming said support rod as an offset angulated engagement finger to overlap said rod of a bottom section of said frame.

3. A shopping cart as claimed in claim 1 wherein said locking cavity is constituted by forming said top end of said straight guide slot as an inverted-U.

4. A shopping cart as claimed in claim 1 wherein said support means is constituted by forming said top end of said support rod in a hook configuration.

5. A shopping cart as claimed in claim 1 wherein said support means is constituted by forming said top end of said support rod in a loop configuration whereby a coat hanger may be secured in said loop.

* * * * *